No. 735,200. PATENTED AUG. 4, 1903.
W. L. BLACK.
ANTIFRICTION DEVICE FOR SUCKER RODS.
APPLICATION FILED MAY 9, 1902.
NO MODEL.
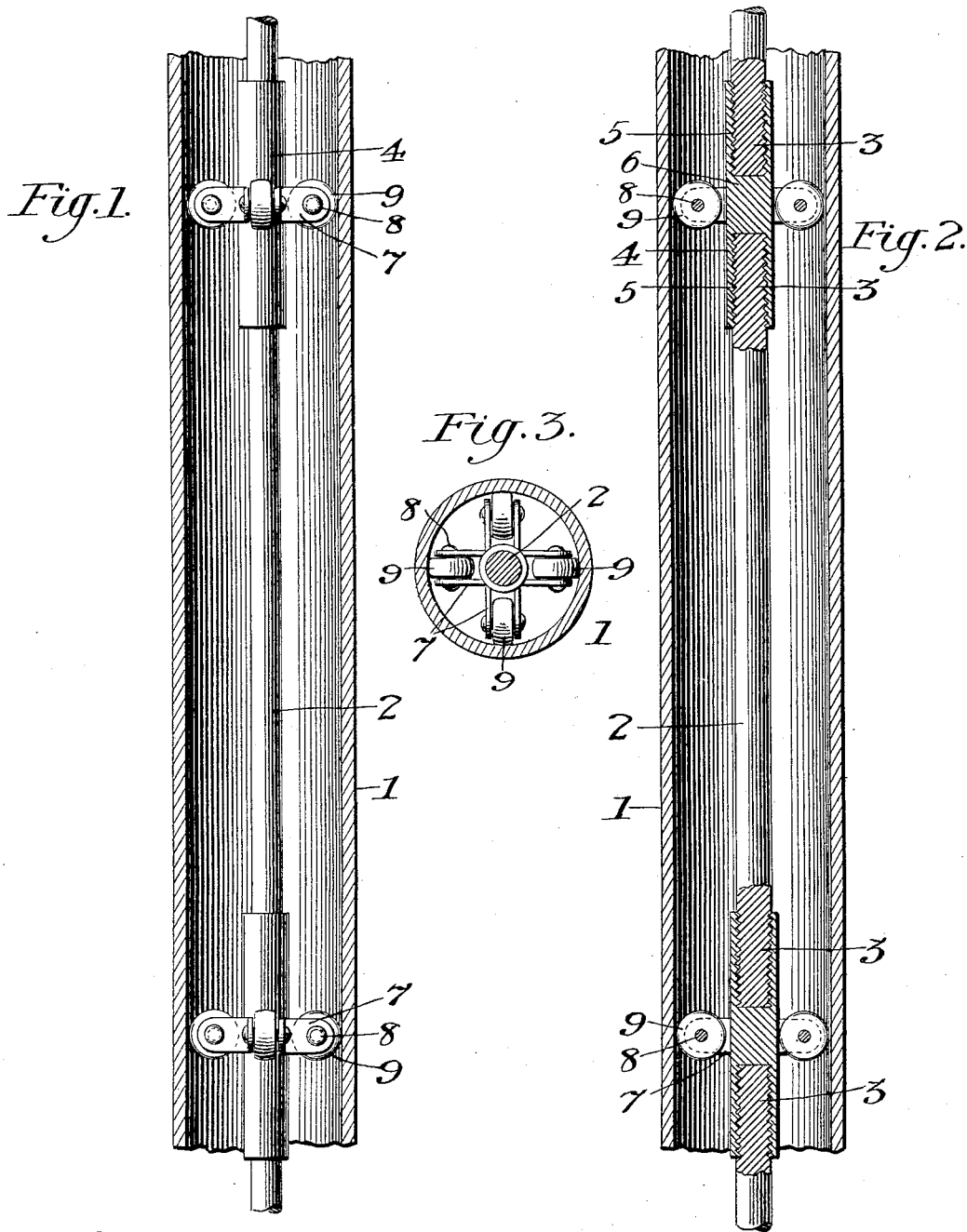

No. 735,200.        Patented August 4, 1903

UNITED STATES PATENT OFFICE.

WILLIAM L. BLACK, OF FORT McKAVETT, TEXAS.

ANTIFRICTION DEVICE FOR SUCKER-RODS.

SPECIFICATION forming part of Letters Patent No. 735,200, dated August 4, 1903.

Application filed May 9, 1902. Serial No. 106,602. (No model.)

*To all whom it may concern:*

Be it known that I, WILLIAM L. BLACK, a citizen of the United States, residing at Fort McKavett, county of Menard and State of Texas, have invented certain new and useful Improvements in Antifriction Devices for Sucker-Rods; and I do hereby declare the following to be a full, clear, and exact description of the invention, such as will enable others skilled in the art to which it appertains to make and use the same.

My invention has for its object to provide a coupling device for sucker-rods and the like in which the union or coupling member is formed of an elongated internally-threaded sleeve receiving and embracing the screw-threaded ends of successive rod-sections for a considerable portion of their lengths, whereby rods of substantially uniform cross-section and of relatively short lengths may be employed and the joints between the various sections are materially strengthened, with the result that the tendency of the rod to buckle or flex laterally at the joints is to a great extent obviated. In order to provide against lateral vibration of the rod as a whole and to preserve the central alinement of the rod in the well-casing, I provide the couplings with a series of antifriction-rollers, disposed about the exterior thereof in such relation as to lie contiguous to the interior of the casing and afford a rolling contact therewith as the rod is reciprocated. While these rollers serve to prevent the rod from rubbing against the casing at any point, they are so disposed in the passage-way of the material flowing in the casing as to interpose but little obstruction to such flow.

My invention is illustrated in the accompanying drawings, in which—

Figure 1 is a longitudinal section through a well-casing, showing the rod-sections and coupling members in elevation. Fig. 2 is a similar view showing the couplings and engaging rod ends in section; and Fig. 3 is a horizontal section through the casing and rod, showing the relative arrangement of the antifriction-rollers.

Referring to the drawings, the numeral 1 represents the well-casing, which is formed of lengths of tubing joined together by the usual couplings or unions to form a continuous unbroken duct or conduit for the material lifted by the pump. Reciprocating within the casing is a sucker-rod 2. Sucker-rods of this general character for use in deep wells have generally heretofore been formed of sections of wood or metal united by short coupling members, each having a shallow screw-thread socket on one end, engaging a threaded nib on one rod-section and a corresponding nib on the other end engaging a socket in the next rod-section, or in the alternative the sections have been coupled directly together by a screw-socket and screw-nib on their respective engaging ends. In the former construction the rods have a constant tendency to buckle or bend laterally at the joints, owing to the small bearing-surface between the coupling and the rod ends, which is not sufficient to withstand the lateral strains due to the sidewise vibration of the rod. In the latter arrangement it has been found necessary to enlarge the ends of the rods at the joint in order to provide sufficient material in the coupling members to prevent rupture of the joint, and in order to avoid the additional cost and weight of rods thus constructed the number of joints are reduced as far as possible by making the rod-sections as long as practicable.

Obviously it is of great advantage to employ rod-sections of uniform cross-section throughout and in relatively short lengths— for instance, of six or eight feet. I accomplish this advantage by forming the rod-sections 2, preferably of the length specified, with external screw-threads 3, extending for a considerable distance from each end, so that each rod-section is of substantially the same cross-section throughout and is therefore not weakened at any point. For the purpose of uniting the ends of rods 2 I provide a coupling 4, formed of an elongated metallic sleeve, which may have a central strengthening-rib 6. The interior of this sleeve is screw-threaded, as at 5 5, from both ends to provide long engaging members for the corresponding long male threads 3 on the ends of the rod-sections. It will be seen that the joint thus constructed has an extensive bearing-surface formed by the engagement of threads 3 and 5 and is materially strengthened to resist buckling or lateral flexure by the cylindrical sleeve.

In order to maintain the rod in its central alinement in the casing to insure proper working of the pump and prevent the heavy friction and wear due to the rod rubbing against the casing, I provide the coupling 4 with a series of antifriction-rollers 9, which are disposed circumferentially about the sleeve and are revolubly mounted on pins 8, secured in ears or lugs 7, projecting from said sleeve and constituting journal-bearings for the rollers. As illustrated, these rollers are four in number, disposed at intervals of ninety degrees about the coupling; but of course a greater or less number of rollers may be provided, as required. This disposition of the rollers offers little obstruction to the flow of material in the casing.

While I have shown my improved coupling applied to relatively short rod-sections, it must be understood that it is applicable to sections of any length, as the object sought—viz., a long screw-threaded engagement between the uniform rod-sections and the sleeve, with a corresponding strengthening of the joint against lateral flexure—is attained irrespective of the length of the rod-sections.

Having thus described my invention, what I claim is—

1. A coupling for sucker-rods, comprising an elongated sleeve provided with relatively long internally-screw-threaded sections adapted to engage the externally-screw-threaded ends of the rod-sections whereby buckling of the joint is prevented, and antifriction-rollers disposed about the exterior of said sleeve midway thereof.

2. A coupling for sucker-rods, comprising an elongated sleeve provided with a central web and relatively long internally-threaded portions between said web and the ends of said sleeve which threaded portions are adapted to receive and engage the externally-threaded ends of the rod-sections whereby buckling at the joint is prevented, ears constituting journal-bearings projecting from said sleeve and antifriction-rollers mounted in said journal-bearings.

3. In a sucker-rod, the combination of successive rod-sections provided with relatively long screw-threaded portions at their respective ends, and couplings for uniting adjacent sections, each of said couplings comprising an elongated sleeve provided with relatively long screw-threaded end sections engaging the rod ends, and antifriction-rollers disposed about the exterior of said sleeve.

In testimony whereof I affix my signature in presence of two witnesses.

WILLIAM L. BLACK.

Witnesses:
RICHARD MERCER,
JNO. D. WALLICK.